(12) United States Patent
Bart et al.

(10) Patent No.: US 10,650,666 B1
(45) Date of Patent: *May 12, 2020

(54) METHOD FOR USING A DRONE TO TEST MONITORING SYSTEM SENSORS

(71) Applicant: Alarm.com Incorporated, Tysons, VA (US)

(72) Inventors: Gary Franklin Bart, Weston, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,940

(22) Filed: Jun. 3, 2019

Related U.S. Application Data

(63) Continuation of application No. 15/995,091, filed on May 31, 2018, now Pat. No. 10,311,710.

(60) Provisional application No. 62/513,255, filed on May 31, 2017.

(51) Int. Cl.
   *G08B 29/14* (2006.01)
   *B64C 39/02* (2006.01)

(52) U.S. Cl.
   CPC .......... *G08B 29/145* (2013.01); *B64C 39/024* (2013.01); *B64C 2201/126* (2013.01); *B64C 2201/146* (2013.01)

(58) Field of Classification Search
   CPC ................ G08B 29/145; B64C 39/024; B64C 2201/126; B64C 2201/146

USPC ........................................................ 340/628
See application file for complete search history.

(56) References Cited

U.S. PATENT DOCUMENTS

| | | | |
|---|---|---|---|
| 7,860,680 B2* | 12/2010 | Arms | H02J 7/025 |
| | | | 702/127 |
| 9,454,907 B2* | 9/2016 | Hafeez | G08G 5/0034 |
| 9,494,936 B2* | 11/2016 | Kerzner | G05D 1/0022 |
| 2014/0336928 A1* | 11/2014 | Scott | G01N 21/88 |
| | | | 701/468 |
| 2016/0180719 A1* | 6/2016 | Wouhaybi | G08G 5/0082 |
| | | | 701/4 |
| 2016/0232794 A1* | 8/2016 | Hafeez | G08G 5/0034 |
| 2018/0089622 A1* | 3/2018 | Burch, V | G06Q 10/0833 |
| 2018/0130196 A1* | 5/2018 | Loveland | G01C 11/02 |

* cited by examiner

*Primary Examiner* — Nay Tun
(74) *Attorney, Agent, or Firm* — Fish & Richardson P.C.

(57) ABSTRACT

Methods, systems, and apparatus, including computer programs encoded on a storage device, for using a drone to test a sensor. In one aspect, the method includes actions of detecting a message (i) broadcast by the drone and (ii) indicating that the drone is going to administer a test of a sensor, determining, by the monitoring system and based on the message and (i) sensor data generated by the sensor in response to the administration of the test, by the drone, within a predetermined period of time of the message or (ii) a lack of sensor data generated by the sensor in response to the administration of the test, by the drone, within a predetermined period of time of the message, whether the sensor is functioning properly, and in response to a determination that the sensor is not functioning properly, storing data indicating that the sensor is not functioning properly.

20 Claims, 4 Drawing Sheets

METHOD FOR USING A DRONE TO TEST MONITORING SYSTEM SENSORS

CROSS-REFERENCE TO RELATED APPLICATIONS

This application is a continuation of U.S. application Ser. No. 15/995,091, filed May 31, 2018, now allowed, which claims the benefit of U.S. Provisional Application Ser. No. 62/513,255 filed May 31, 2017 and entitled "Method for Using a Drone to Test Monitoring System Sensors." Both of these prior applications are incorporated by reference in their entirety.

BACKGROUND

Autonomous surveillance drones ("drones") can navigate a property and use one or more drone-mounted sensors, cameras, or the like to surveil the property. Surveilling the property may include using the drone-mounted sensors, drone-mounted cameras, or the like to capture data about the property, process the captured data, and determine, alone or with the aid of one or more other components of the monitoring system, whether any activity is occurring in the property that may be indicative of a potential event based on the captured data.

However, in a typical monitoring system, a drone is not likely to be continuously performing surveillance operations for the property. When not performing surveillance operations, the drone may be inactive on one or more drone charging stations and fully charged.

SUMMARY

A drone can be deployed and used to test one or more sensors, cameras, or the like employed by a monitoring system. In some implementations, a monitoring system control unit may instruct a drone to launch from a charging station and test a sensor used by the monitoring system. The instructions may include a launch instruction, a sensor identifier, a sensor location, a test type identifier, a combination thereof, or the like. The drone can navigate to the sensor and administer the sensor test.

Administration of the sensor test may include the drone performing one or more operations to modify the environment in the vicinity of the sensor. The monitoring system control unit, a monitoring application server, or both, may evaluate the sensor data, or lack thereof, generated by the sensor in response to the environmental change in the vicinity of the sensor and determine if the sensor is functioning properly. The monitoring system control unit, the monitoring application server, or both, may generate a sensor status report that includes the testing results.

According to one innovative aspect of the present disclosure, A system for using a drone to test monitoring system sensors is disclosed. The system may include a monitoring unit. In one implementations, the monitoring unit may include a network interface, one or more processors, and one or more storage devices that include instructions that are operable, when executed by the one or more processors, to cause the one or more processors to perform operations. The operations may include detecting, by the monitoring unit, a first message (i) broadcast by the drone and (ii) indicating that the drone is going to administer a test of a monitoring system sensor that is located in an indoor portion of a property, determining, by the monitoring unit and based on the first message and (i) sensor data generated by the monitoring system sensor in response to the administration of the test, by the drone, within a predetermined period of time of the first message or (ii) a lack of sensor data generated by the monitoring system sensor in response to the administration of the test, by the drone, within a predetermined period of time of the first message, whether the monitoring system sensor is functioning properly, and in response to a determination that the monitoring system sensor is not functioning properly, storing, by the monitoring unit, data indicating that the monitoring system sensor is not functioning properly.

Other aspects include corresponding methods, apparatus, and computer programs to perform actions of methods defined by instructions encoded on one or more computer storage devices.

These and other versions may optionally include one or more of the following features. For instance, in some implementations, the operations may include in response to a determination that the monitoring system sensor is functioning properly disregarding, by the monitoring unit, the sensor data generated by the monitoring system sensor within a predetermined period of time of the first message, and storing, by the monitoring unit, data indicating that the monitoring system sensor is functioning properly.

In some implementations, the operations may further include detecting, by the monitoring unit, a second message (i) broadcast by the drone and (ii) indicating that the drone has completed administration of the test of the monitoring system sensor that is located in the indoor portion of the property.

In some implementations, determining, by the monitoring unit and based on the first message and (i) sensor data generated by the monitoring system sensor in response to the administration of the test, by the drone, within a predetermined period of time of the first message or (ii) a lack of sensor data generated by the monitoring system sensor in response to the administration of the test, by the drone, within a predetermined period of time of the first message, whether the monitoring system sensor is functioning properly may include determining, by the monitoring unit and based on the first message and (i) the sensor data generated by the monitoring system sensor during a period of time that occurs between the first message and the second message or (ii) the lack of sensor data generated by the monitoring system sensor during a period of time that occurs between the first message and the second message, whether the monitoring system sensor is functioning properly.

In some implementations, determining, by the monitoring unit and based on the first message and (i) sensor data generated by the monitoring system sensor in response to the administration of the test, by the drone, within a predetermined period of time of the first message or (ii) a lack of sensor data generated by the monitoring system sensor in response to the administration of the test, by the drone, within a predetermined period of time of the first message, whether the monitoring system sensor is functioning properly may include determining that the sensor data generated by the monitoring system sensor includes sensor data that was not expected, by the monitoring unit, to be generated in response to the administration of the test, and based on determining that the sensor data generated by the monitoring system sensor includes sensor data that was not expected to be generated in response to the administration of the test, determining that the monitoring system sensor is not functioning properly.

In some implementations, determining, by the monitoring unit and based on the first message and (i) sensor data generated by the monitoring system sensor in response to the administration of the test, by the drone, within a predetermined period of time of the first message or (ii) a lack of sensor data generated by the monitoring system sensor in response to the administration of the test, by the drone, within a predetermined period of time of the first message, whether the monitoring system sensor is functioning properly may include determining that the sensor data generated by the monitoring system sensor includes sensor data that was expected, by the monitoring unit, to be generated in response to the administration of the test, and based on determining that the sensor data generated by the monitoring system sensor includes sensor data that was expected to be generated in response to the administration of the test, determining that the monitoring system sensor is functioning properly.

In some implementations, the monitoring system sensor that is located in the indoor portion of the property may include a motion sensor, and the administration of the test may include the drone navigating through a portion of the property that is within range of the motion sensor.

In some implementations, the monitoring system sensor that is located in the indoor portion of the property may include a glass break sensor, and the administration of the test may include the drone using a speaker to output, within range of the glass break sensor, audio signals having a frequency that is sufficient to trigger the glass break sensor.

In some implementations, the monitoring system sensor that is located in the indoor portion of the property may include a smoke detector, and the administration of the test may include the drone outputting smoke within range of the smoke detector.

In some implementations, the monitoring unit may be located at a location that is remote from the property.

In some implementations, the operations may further include transmitting, by the monitoring system and to the drone, an instruction to test one or more sensors.

These, and other aspects of the present disclosure provide multiple advantages. For example, the present disclosure allows a monitoring system to consistently test and monitor sensors at a property to ensure that these sensors are functioning properly. This is an important improvement on existing system because the monitoring system can ensure, using the techniques of the present disclosure, that the sensors in the property are functioning for their intended purpose. This improves the performance of the monitoring system by ensuring that the monitoring system sensors will accurately detect events such as break-ins, fires, carbon monoxide leaks, and other events. As such, the present disclosure provides advantages that result in a technical innovation that can improve the performance of a monitoring system, potentially save lives, and protect a person's property.

DETAILED DESCRIPTION

Figure 1:
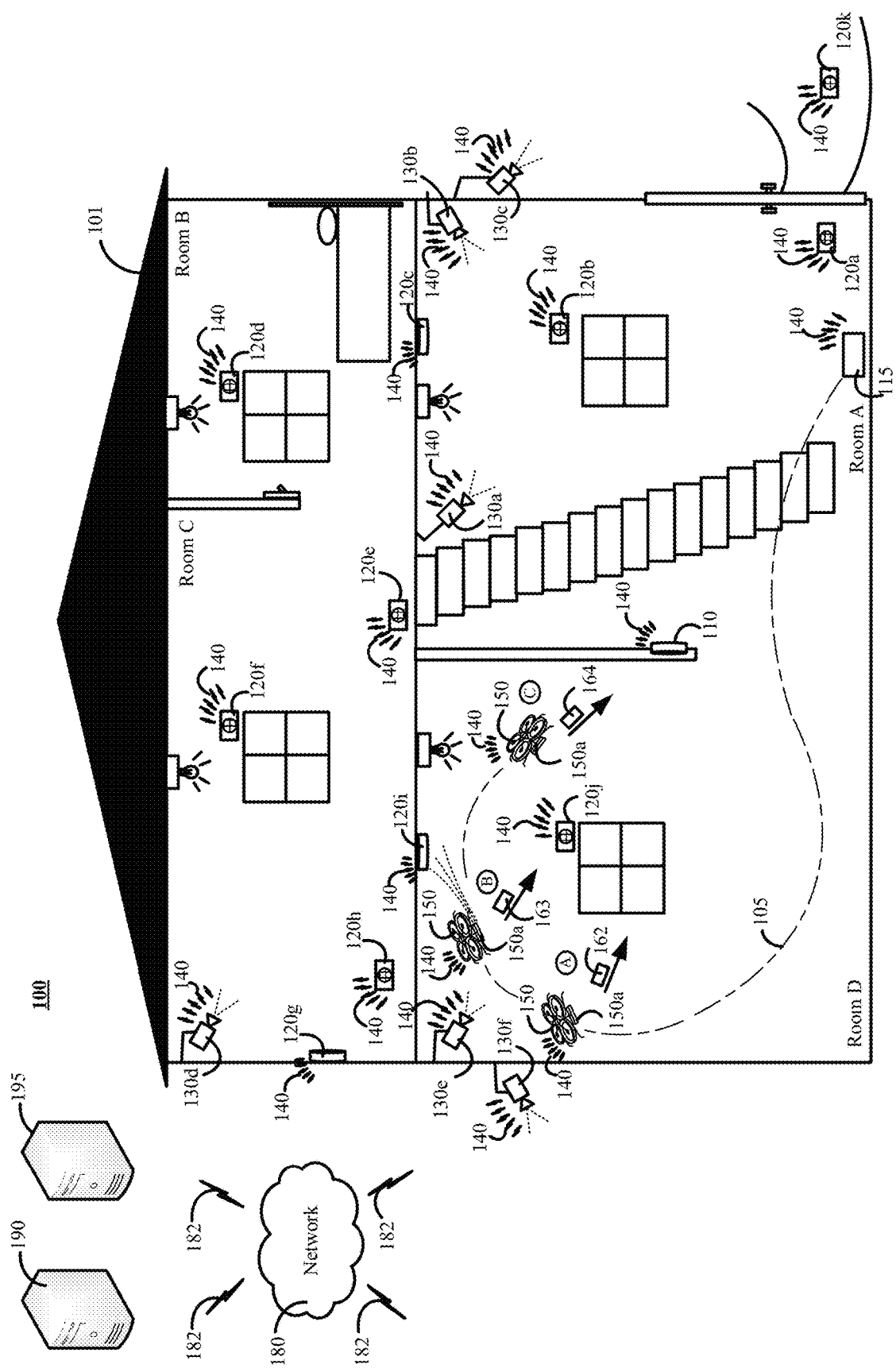
FIG. 1 is a contextual diagram of an example of using a drone to test monitoring system sensors.

FIG. 1 is a contextual diagram of an example of using a drone 150 to test monitoring system 100 sensors 120a, 120b, 120c, 120d, 120e, 120f, 120g, 120h, 120i, 120j, 120k.

The monitoring system 100 may include at least a monitoring system control unit 110, a drone charging station 115, a network 140, a drone 150, and one or more sensors 120a, 120b, 120c, 120d, 120e, 120f, 120g, 120h, 120i, 120j, 120k. In some implementations, the monitoring system 100 may also include one or more cameras 130a, 130b, 130c, 130d, 130e, 130f, a network 180, one or more communication links 182, a monitoring application server 190, and a central alarm station server 195.

The monitoring system control unit 110 is configured to detect and process (i) sensor data generated by the one or more sensors 120a, 120b, 120c, 120d, 120e, 120f, 120g, 120h, 120i, 120j, 120k, (ii) images, videos, or the like captured and transmitted by the one or more cameras 130a, 130b, 130c, 130d, 130e, 130f, (iii) images, videos, or the like captured and transmitted by a drone 150 mounted camera, (iv) sensor data generated by one or more drone 150 mounted sensors, (v) messages generated and broadcasted by the drone 150, or (vi) a combination thereof. In some implementations, the monitoring system control unit 110 may be configured to perform processing and analysis of the detected data to determine whether one or more potential events such as an alarm event is occurring at the property 101.

In some implementations, the monitoring application server 190 may supplement, or replace, the functionality of the monitoring system control unit 110. For example, the monitoring system control unit 110 may detect and relay (i) sensor data generated by the one or more sensors 120a, 120b, 120c, 120d, 120e, 120f, 120g, 120h, 120i, 120j, 120k, (ii) images, videos, or the like captured and transmitted by the one or more cameras 130a, 130b, 130c, 130d, 130e, 130f, (iii) images, videos, or the like captured and transmitted by a drone 150 mounted camera, (iv) sensor data generated by one or more drone 150 mounted sensors, (v) messages generated and broadcasted by the drone 150, or (vi) a combination thereof, to a monitoring application server 190 using the networks 140, 180, and one or more communications links 182. In such implementations, the monitoring application server 190 may perform processes and analysis of the relayed data in an effort to detect the potential existence of one or more events such as alarm events.

In some implementations, the monitoring application server 190 may be a cloud-based solution that can replace the local monitoring system control unit 110. For example, in this implementation (and other implementations) each sensor, camera, drone, or the like may be equipped with a cellular communication device that can directly communicate generated sensor data, captured camera data, drone sensor data, drone camera data, drone generated messages, or the like to the monitoring application server 190 via the one or more networks 140, 180, and one or more communication links 182. The monitoring application server 190 can then perform processing and analysis of the sensor data, camera data, and drone data that it receives in order to detect the potential existence of one or more events such as alarm events. In some implementations, the monitoring application server 190 may be configured to perform each of the operations described herein as being performed by the monitoring system control unit 110. Accordingly, the monitoring system 100 may include a local "monitoring unit" in the form of a monitoring system control unit 110 or a remote "monitoring unit" in the form of a monitoring application server 190.

The monitoring system control unit 110 can perform operations to monitor the functionality of components of the monitoring system 100 such as sensors 120a, 120b, 120c, 120d, 120e, 120f, 120g, 120h, 120i, 120j, 120k, cameras 130a, 130b, 130c, 130d, 130e, 130f, and the like. Monitoring the functionality of the components of the monitoring system 100 may include, for example, instructing a drone 150 to administer a test to one or more of the monitoring system components and evaluating the response of the one or more monitoring system components to the administered test. Testing the monitoring system components may include, for example, modifying the environment in the vicinity of a monitoring system component such as a sensor 120a, 120b, 120c, 120d, 120e, 120f, 120g, 120h, 120i, 120j, 120k, a camera 130a, 130b, 130c, 130d, 130e, 130f, or the like.

The monitoring system control unit 110 may employ the services of a drone 150 to modify the environment in the vicinity of a monitoring system component such as a sensor 120a, 120b, 120c, 120d, 120e, 120f, 120g, 120h, 120i, 120j, 120k, a camera 130a, 130b, 130c, 130d, 130e, 130f, or the like. Modifying the environment in the vicinity of the monitoring system component such as a sensor 120a, 120b, 120c, 120d, 120e, 120f, 120g, 120h, 120i, 120j, 120k, a camera 130a, 130b, 130c, 130d, 130e, 130f, or the like may include administering a particular test that is designed to trigger a specific response from the sensor 120a, 120b, 120c, 120d, 120e, 120f, 120g, 120h, 120i, 120j, 120k, a camera 130a, 130b, 130c, 130d, 130e, 130f, or the like. For example, a drone 150 may be instructed by the monitoring system control unit 110 to navigate to a smoke detector and emit a chemical based smoke, fog, or the like that is designed to trigger the smoke sensor to generate sensor data that is indicative of the potential presence of smoke.

The monitoring system control unit 110 may evaluate the response of each tested monitoring system component to an administered test. For example, the monitoring system control unit 110 may monitor the property 101 to detect sensor data, camera data, or the like generated by a tested monitoring system component. If the monitoring system control unit 110 that the tested monitoring system component generated sensor data that corresponds to an expected response to the administered test, then the monitoring system control unit 110 may determine that the tested monitoring system component is functioning properly. Alternatively, if the monitoring system control unit 110 determines that the tested monitoring system component did not generate sensor data corresponding to an expected response to the administered test, then the monitoring system control unit 110 may determine that the tested monitoring system component is not functioning properly.

In some implementations, the drone 150 may communicate with the monitoring system control unit 110 regarding the testing of a particular component of a monitoring system 100. For example, the drone 150 may broadcast a first message that can be detected by a monitoring system control unit 110 prior to administering a test to the particular component of monitoring system 100. The first message may include a first timestamp of a time prior to administering a test of the monitoring system component and data indicating that a test of the particular component of the monitoring system 100 is imminent. In some implementations, the first message may instruct the monitoring system control unit 110, monitoring application server 190, or both, to disregard (e.g., ignore) sensor data generated by the sensor to which the test will be administered. This may avoid a false alarm from being triggered in response to the test.

Alternatively, or in addition, the drone 150 may broadcast a second message that can be detected by the monitoring system control unit 110. The second message may include a second timestamp and data indicating that the drone 150 administered a test of the particular component of the monitoring system 100 at the time indicated by the second timestamp.

Alternatively, or in addition, the drone 150 may broadcast a third message that can be detected by the monitoring system control unit 110. The third message may include a third timestamp of a time after the administration of a test of the monitoring system component has completed and data indicating that the drone 150 has previously administered a test of the particular monitoring system component at some point prior to the third timestamp. In some implementations, the third message may instruct the monitoring system control unit 110, monitoring application server 190, or both, to stop disregarding (e.g., stop ignoring) sensor data generated by the sensor that was tested. For example, the third message may instruct the monitoring system control unit 110 should trigger an alarm based on sensor data generated by the tested sensor indicative of an event if the sensor data is generated at a point in time after the third timestamp.

The monitoring system control unit 110 can then determine whether the tested component generated an expected response to the test. In some instances, the monitoring system control unit 110 may determine that the response that the particular component generated a response to the test that was expected by the monitoring system control unit 110. In such instances, the monitoring system control unit 110 may determine that the particular component of the monitoring system 100 is functioning properly. In some instances, the monitoring system control unit 110 may determine that the particular component generated a response to the test that was different than the response that was expected by the monitoring system control unit 110. In such instances, the monitoring system control unit 110 may determine that the particular monitoring system component is malfunctioning. In some instances, the monitoring system control unit 110 may determine that the particular component did not generate a response to the test at all. In such instances, the monitoring system control unit 110 may determine that the particular component of the monitoring system 100 is malfunctioning.

By way of example with reference to FIG. 1, the monitoring system control unit 110 may transmit one or more instructions to the drone 150 that instruct the drone 150 to test a sensor such as smoke detector 120i. In the example of FIG. 1, the one or more instructions may include at least (i) a launch instruction, (ii) a sensor identifier that identifies the smoke detector 120i, and (iii) an instruction to test the sensor (e.g., smoke detector 120i) identified by the one or more instructions. Alternatively, or in addition, the one or more instructions may also include one or more of a sensor location, a test type identifier, a camera location, a camera identifier, a combination thereof, or the like. In some implementations, the instructions to test the sensors transmitted by the monitoring system control unit 110 (or monitoring application server 190) may be triggered by a command originated by a user device. In other implementations, the instructions transmitted by the monitoring system control unit 110 (or monitoring application server 190) may be automatically generated and transmitted by the monitoring system control unit 110 (or monitoring application server 190) as part of a periodically scheduled sensor testing routine.

The drone 150 may launch from the charging station 115, and navigate towards the smoke detector 120*i* on a navigation path 105. The navigation path 105 may be determined based on a predetermined navigation path, a three-dimensional volumetric map, or the like. For example, in some implementations, the drone 150 may store a predetermined navigation path to each component of the monitoring system 100 such as sensors, cameras, or the like in the drone's 150 memory unit. In such instances, the drone 150 may be configured to receive a set of one or more instructions including a launch instruction, a sensor identifier, or the like and select a particular predetermined navigation path based on the received set of instructions that identify a particular sensor. Alternatively, for example, the drone 150 may dynamically navigate the property 101 using a three-dimensional volumetric map of the property 101 that is stored in the drone's 150 memory unit. For example, the drone 150 may receive a set of instructions that includes a launch instruction, a sensor identifier, or the like, determine a location of the sensor identified by the sensor identifier, plot the location of the sensor identified by the received sensor identifier on the three-dimensional volumetric map, determine the drone's current location on the three-dimensional volumetric map, and determine a flight path 105 from the drone's 150 current location to the location of the identified sensor using the stored three-dimensional volumetric map.

At stage A, the drone 150 can navigate to within a predetermined distance of the smoke detector 120*i*. In response to determining that the drone 150 is within a predetermined distance of the smoke detector 120*i*, the drone may generate and broadcast a first message 162 via the network 140 that is detected by the monitoring system control unit 110. The network 140 may include one or more of a LAN, a WAN, a cellular network, the Internet, a combination thereof, or the like. The first message 162 may include data indicating that (i) the drone 150 is within a predetermined distance of the smoke detector 120*i*, (ii) the drone 150 is going to administer a test of the smoke detector 120*i*, (iii) the drone 120*h* is going to administer a test of the smoke detector 120*i* within a predetermined amount of time, (iv) a first timestamp identifying the point in time that the first message is broadcast, (v) a combination thereof, or (vi) the like. In some implementations, to reduce the triggering of false alarms, the first message may instruct the monitoring system control unit 110, monitoring application server 190, or both, to disregard (e.g., ignore) sensor data generated by the sensor to which the test will be administered. In some implementations, the monitoring system control unit 110 can monitor sensor data generated by the smoke detector 120*i* for sensor data that should be generated in response to the test administered by the drone 150.

At stage B, the drone 150 may administer a test to the smoke detector 120*i*. For example, the drone 150 may use a drone-mounted sensor testing unit 150*a* to generate smoke. The generated smoke may be comprised of any combination of gases, liquids, and solids that can trigger a smoke detector 120*i* to generate sensor data indicative of the presence of smoke including, but not limited to, real smoke generated by burning matter, chemical smoke generated by a chemical reaction, fog, or the like. The drone 150 may use the drone-mounted sensor testing unit 150*a* to direct the smoke towards the smoke detector 120*i*. In some implementations, for example, the drone 150 may use a fan to blow the generated smoke towards the smoke detector 120*i*. In response to administering the test of the smoke detector, the drone 150 may generate and broadcast a second message 163 that includes a second timestamp that is indicative of the point in time when the drone 150 administered the test of the smoke detector 120*i*.

At stage C, after administering the test to the smoke detector 120*i*, the drone 150 may generate and broadcast a third message 164 via the network 140 that is detected by the monitoring system control unit 110. The third message 164 may include data indicating that (i) the drone 150 has administered a test of the smoke detector 120*i*, (ii) a third timestamp that is associated with the point in time when the third message was broadcast, (iii) a combination thereof, or (iv) the like. The message 164 can be used to notify the monitoring system control unit 110 that a test of the smoke detector 120*i* has been administered. In some implementations, the third message may instruct the monitoring system control unit 110, monitoring application server 190, or both, to stop disregarding (e.g., stop ignoring) sensor data generated by the sensor that was tested. For example, the third message may instruct the monitoring system control unit 110 should trigger an alarm based on sensor data generated by the tested sensor indicative of an event if the sensor data is generated at a point in time after the third timestamp.

The monitoring system control unit 110 may then evaluate the results of the administered test. In some implementations, for example, the monitoring system control unit 110 may evaluate sensor data that was generated, or lack thereof, by the smoke detector 120*i* within a predetermined amount of time of the second timestamp that is indicative of the point in time when the test was administered. Alternatively, or in addition, the monitoring system control unit 110 may evaluate sensor data that was generated, or lack thereof, by the smoke detector 120*i* between the point in time identified by the first timestamp and the point in time identified by the third timestamp. In each respective scenario, the monitoring system control unit 110 may determine whether the sensor data generated, or lack thereof, is indicative of the specific result expected in response to the administered test. In the example of FIG. 1, for example, the smoke detector 120*i* may be determined to be functioning properly if the smoke detector 120*i* generates and broadcasts sensor data that is indicative of the presence of smoke. Alternatively, the smoke detector 120*i* may be determined to not be functioning properly if the smoke detector 120*i* does not generate sensor data in response to the smoke, generates insufficient data in response to the smoke (e.g., generates sensor data that does not indicate that smoke is present, generates sensor data that is noisy, generates sensor data that is indecipherable, or the like), or the like.

The example of FIG. 1 is described within the context of a monitoring system control unit 110 instructing a drone 150 to administer a sensor test, the monitoring system control unit 110 detecting messages generated and broadcast by the drone 150, and the monitoring system control unit 110 evaluating sensor data generated by the smoke detector 120*i* in response to the administered test. However, the present disclosure need not be so limited. For example, the monitoring application server 190 may aid, or replace, the monitoring system control unit 110 described with respect to FIG. 1. For example, in some implementations, the monitoring application server 190 may transmit one or more instructions to initiate administration of a test of a sensor the monitoring system control unit 110 and the monitoring system control unit may relay the one or more instructions to the drone 150. Alternatively, or in addition, the monitoring system control unit 110 may relay data related to detected messages, detected sensor data, detected lack of sensor data, or the like to the monitoring application server 190 for processing, evaluation, and sensor status report generation. In other implementations, the monitoring application server 190 may replace the monitoring system control unit 110 with respect to the sensor test initiation, sensor data (or lack thereof) analysis, and sensor status report generation aspects of the present disclosure. For example, the monitoring application server 190 may be configured to directly communicate with the drone 150. In such instances, the monitoring application server 190 may transmit one or more instructions directly to the drone 150 using the networks 180, 140 and one or more communication links 182. Similarly, the drone 150, one or more sensors, one or more cameras, or the like may be configured generate and broadcast messages, sensor data, or camera data, respectively, that can be detected, processed, and analyzed by the monitoring application 190 in the same manner described with respect to the monitoring system control unit 110 described above.

In other implementations, the one or more instructions transmitted to a drone 150 to initiate the administering of one or more tests to one or components of the monitoring system 100 may originate from a user device. The user device may include, for example, a smartphone, a tablet, a smartwatch, a laptop computer, a desktop computer, or the like. In some implementations, the user device may also be capable of detecting sensor data generated by a sensor, camera, or the like in response to the administered test. In such instances, the user device may evaluate the generated sensor data and determine whether the sensor is functioning properly. Alternatively, data representing the sensor data may be provided for display on the user interface of the user device for review by a human user.

The example of FIG. 1 also described the administration of a test to a particular type of sensor—e.g., a smoke detector 120*i*. However, the present disclosure need not be so limited. For example, the drone 150 may be used to test any type of monitoring system sensor, camera, or the like. For example, the drone 150 may be instructed to test a motion sensor. In such instances, the drone 150 may (i) navigate to the motion sensor in a manner designed to trigger the motion sensor to generate sensor data indicative of detected motion, (ii) generate and broadcast a first message indicative of the fact that the drone 150 is going to administer a test to the motion sensor, (iii) navigate past the motion sensor, (iv) generate and broadcast a second message with a timestamp associated with the administered test of the motion sensor, and (v) generate and broadcast a third message indicative of the fact that the drone 150 has completed the test of the motion sensor. In such instances, the monitoring system control unit 110, the monitoring application server 190, or both may analyze the sensor data, or lack thereof, generated by motion sensor during the time period between the first message and the third message to evaluate whether the motion sensor generated sensor data that is indicative of movement in response to the administered test. Alternatively, or in addition, the monitoring system control unit 110, the monitoring application server 190, or both, may analyze the sensor data, or lack thereof, generated by the motion sensor within a predetermined amount of second timestamp associated with the administered test. In some implementations, similar tests may be administered on monitoring system 100 components that utilize passive infrared sensors, cameras with motion detection analytics capabilities (either on board, via a locally connected device, or via a remotely connected network device) that trigger the camera to activate and start recording images, video, audio, or a combination thereof in response to the detection of motion.

The monitoring system 100 may test other types of sensors using the drone 150. For example, the drone 150 may be instructed to test a sensor that is triggered based on the detection of audio signals such as a glass-break sensor. In such instances, the drone 150 may (i) navigate to the glass-break sensor, (ii) generate and broadcast a first message indicative of the fact that the drone 150 is going to administer a test to the glass-break sensor, (iii) use the drone-mounted sensor testing unit 150*a* to generate and output an audio signal (e.g., using a speaker) that is designed to trigger the glass-break sensor to generate and broadcast sensor data indicative of a detected glass break, (iv) generate and broadcast a second message with a timestamp associated with the administered test of the glass-break sensor, and (v) generate and broadcast a third message indicative of the fact that the drone 150 has completed the test of the glass-break sensor. In such instances, the monitoring system control unit 110, the monitoring application server 190, or both may analyze the sensor data generated by the glass-break sensor during the time period between the first message and the third message to evaluate whether the glass-break sensor generated sensor data that is indicative of breaking glass in response to the administered test. Alternatively, or in addition, the monitoring system control unit 110, the monitoring application server 190, or both, may analyze the sensor data, or lack thereof, generated by the glass-break sensor within a predetermined amount of time of the second timestamp associated with the administered test. In some implementations, similar tests may be employed on monitoring system 100 components that utilize audio analytics such as cameras with audio detection analytics capabilities (either on board, via a locally connected device, or via a remotely connected network device) that trigger the camera to activate and start recording images, video, audio, or a combination thereof in response to the detection of certain audio signals.

Accordingly, the aforementioned system and method may be used to test any type of sensor that may be used in a monitoring system 100—and not just the exemplary sensors described above.

Figure 2:
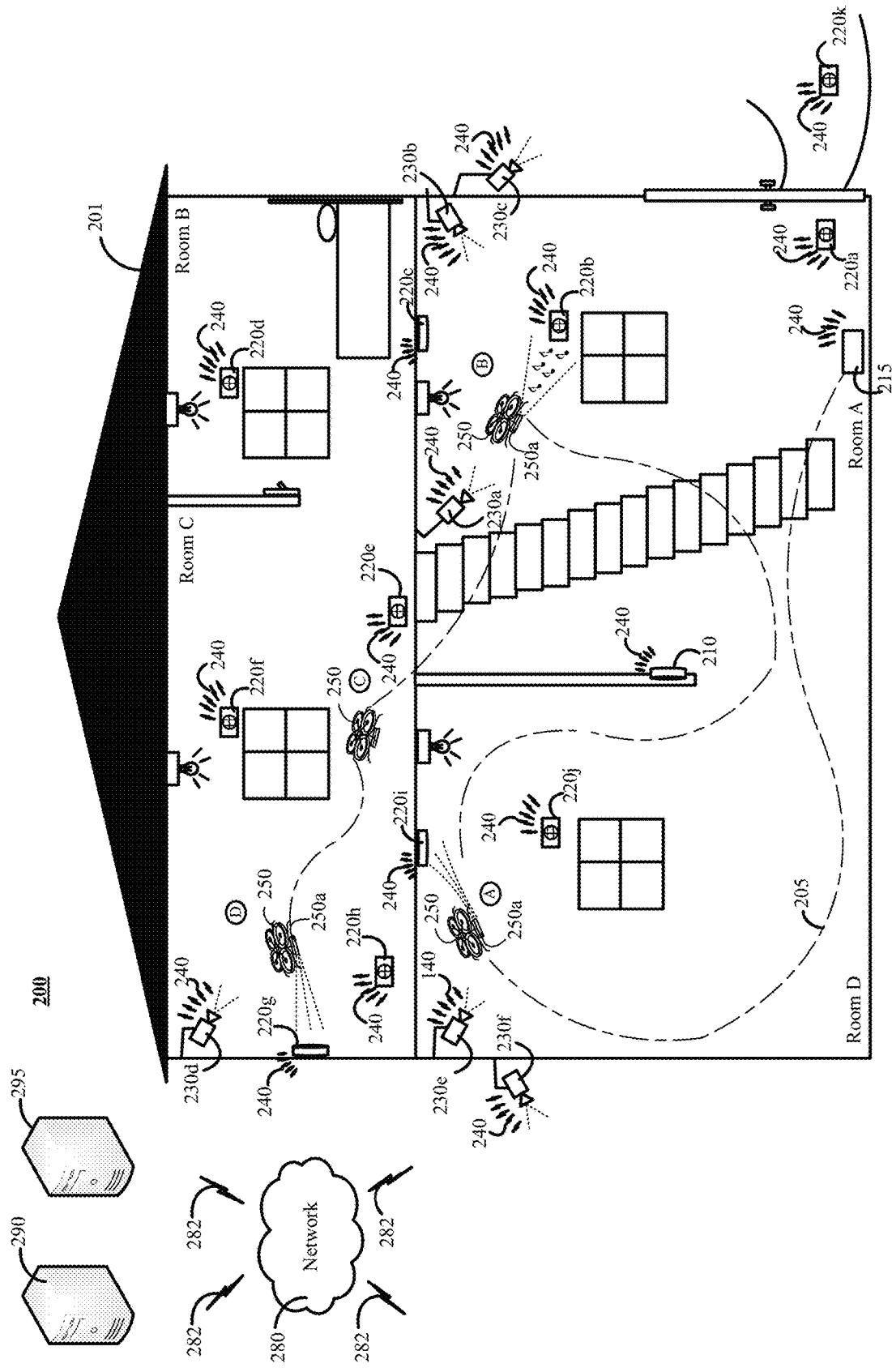
FIG. 2 is a contextual diagram of another example of using a drone to test monitoring system sensors.

FIG. 2 is a contextual diagram of another example of using a drone 250 to test monitoring system 200 sensors 220*a*, 220*b*, 220*c*, 220*d*, 220*e*, 220*f*, 220*g*, 220*h*, 2220*i*, 220*j*, 220*k*.

The monitoring system 200 is the same as the monitoring system 100 described with respect to FIG. 1. However, the monitoring system 200 uses a drone 250 to test multiple sensors in the property 201.

By way of example, a monitoring system control unit 210 (or monitoring application server 290) may transmit one or more instructions to the drone 250. The instructions may include, for example, one or more instructions to launch, one or more instructions to test one or more sensors, one or more instructions to test one or more cameras, or the like in the property 201. In some implementations, the one or more instructions to test one or more sensors, cameras or the like may include (i) one or more sensor identifiers, (ii) one or more sensor locations, (iii) one or more sensor types, (iv) one or more sensor test types, (v) one or more camera identifiers, (vi) one or more camera locations, (vii) one or more camera locations, (viii) one or more camera test types, (v) a combination thereof, or (vi) the like. The drone 250 may receive the one or more instructions, navigate through the property 201 to each sensor, camera, or the like identified by the received instructions, and administer a test of each respective sensor, camera, or the like identified by the received instructions. The monitoring system control unit 210 (or monitoring application server 290) may detect and evaluate sensor data, camera data, or the lack thereof, that is generated in response to the administered test. In some implementations, the monitoring system control unit 210 (or monitoring application server 290) may detect and evaluate sensor data, camera data, or the lack thereof, generated in response to response to the administered test with reference to a first message, second message, or third message that may be generated and broadcast for each sensor test, camera test, or the like that is administered by the drone 150, 250 as described with respect to FIG. 1.

By way of example with reference to FIG. 2, the monitoring system control unit 210 can transmit one or more instructions to the drone 250 to initiate a test of components (e.g., sensors, cameras, or the like) of the monitoring system 200. For example, the monitoring system control unit 210 may generate and transmit instructions that instruct the drone 250 to test (i) the smoke detector 220i, (ii) the glass-break sensor 220b, (iii) the motion sensor 220e, and (iv) the thermostat 220g. In some implementations, the one or more instructions from the monitoring system control unit 210 may also include a test type identifier that identifies the particular test type that should be administered to each respective sensor, camera, or the like. The drone 250 may identify a particular sensor test for a particular sensor based on the test type identifier. In some implementations, the drone 250 may store a test type database in the drone's 250 memory unit. In such instances, the drone 250 may be able to perform a look-up of a particular test type from the database of test types given a particular type of sensor, a sensor identifier, a sensor test type identifier, a particular type of camera, a camera identifier, a camera test type identifier, or the like.

The drone 250 may then obtain a navigation path that the drone 250 can use to travel to each respective sensor identified in the instructions from the monitoring system control unit 210. In some implementations, the drone 250 may access one or more stored predetermined navigation paths. In such instances, the drone 250 may generate a navigation path 205 based on the predetermined navigation paths stored in the drone's memory unit. The navigation paths stored in the drone's 250 memory unit may include navigation paths from the drone's charging station 215 to one or more particular sensors, one or more particular cameras, or the like. The navigations paths stored in the drone's 150 memory unit may also include navigation paths from a particular sensor (or camera) in the property 201 to each of the other respective sensors (or cameras) in the property 201.

Alternatively, the drone 250 may dynamically generate a navigation path 205 based on a three-dimensional volumetric map of the property 201 that is stored in the drone's 250 memory unit. For example, the drone 250 may plot a location of each sensor, camera, or the like the drone 250 is instructed to test on the coordinate system on which the three-dimensional volumetric map of the property 201 stored in the drone's 250 memory unit is based. The drone 250 can plot the drone's 250 current location on the coordinate system on which the three-dimensional volumetric map of the property 201 is based. The drone 250 can analyze one or more of the permutations of different navigation paths that may exist for navigating to, and between, each of the respective sensors, cameras, or the like that the drone 250 is instructed to test. The drone 250 may then select one or more navigations paths identified during the analyzing stage for use in navigating the property to test the one or more sensors, one or more cameras, or the like identified by the received instructions.

Alternatively, for example, the monitoring system control unit 210, the monitoring application server 290, or a human user using a user device may provide a navigation path 205 to the drone 250 that the drone can use to navigate to each respective sensor, camera, or the like that the drone 250 is instructed to test. Alternatively, for example, in some implementations, a user of user device may manual pilot the drone 250 to each respective sensor of the property that is to be tested.

The drone 250 may navigate to the first sensor in the set of sensors that are to be tested based on the one or more instructions received from the monitoring system control unit 210. For example, the drone 250 may navigate along a navigation path 205 to a first sensor such as a smoke detector 220i. At stage A, the drone 250 may administer a test of the smoke detector 220i. Administering the test of the smoke detector 220i may include, for example, using the drone's drone-mounted sensor testing unit 250a to generate smoke within a vicinity of the smoke detector 220i. In some implementations, the drone 250 may administer the test to the smoke detector 220i using the three-stage process for administering a sensor test that was described with respect to FIG. 1. Alternatively, the drone 250 may administer a test of smoke detector 220i that uses less than each of the first message, the second message, and the third message described with reference to FIG. 1. For example, in some implementations, the drone 250 may utilize a single-stage testing process that generates and broadcasts only the second message that includes a timestamp indicative of point in time when the test of the smoke detector 220i was administered. In such instances, the monitoring system 100 may then evaluate the functionality of the smoke detector 220i based on sensor data, or lack thereof, detected within the predetermined time period of the timestamp from the second message. For example, the monitoring system 200 may use only the timestamp included in the second message prior to connected the monitoring system 200 to a central alarm station server 295 that will initiate a response by one or more law enforcement agencies in response to a triggered alarm. Alternatively, or in addition, monitoring system 200 may use only the timestamp from the second message when the monitoring system 200 has been set to a "test state" that temporarily disables the monitoring system 200 from contacting a central alarm station server 195, law enforcement agency, or the like in response to a triggered alarm.

The drone 250 may continue to navigate to each respective sensor, camera or the like that was identified in the received instructions from the monitoring system control unit 210. For example, the drone 250 may continue to navigate along the navigation path 205 to a glass-break sensor 220b. At stage B, the drone 250 may administer a test of the glass-break sensor 220b by using the drone-mounted sensor testing unit 250a to generate an audio output that includes a sound pattern, a particular sound frequency, or the like that is associated with glass breaking. In some implementations, the drone 250 may administer the test to the glass-break sensor 220b using the three-stage process for administering a sensor test that was described with respect to FIG. 1. Alternatively, the drone 250 may administer a test of glass-break sensor 220b that uses less than each of the first message, the second message, and the third message described with reference to FIG. 1. For example, in some implementations, the drone 250 may utilize a single-stage testing process that generates and broadcasts only the second message that includes a timestamp indicative of point in time when the test of the glass-break sensor 220*b* was administered. In such instances, the monitoring system 100 may then evaluate the functionality of the glass-break sensor 220*b* based on sensor data, or lack thereof, detected within the predetermined time period of the timestamp form the second message.

The drone 250 may continue to navigate to the next respective sensor, camera or the like that was identified in the received instructions from the monitoring system control unit 210. For example, the drone 250 may continue to navigate along the navigation path 205 to a motion sensor 220*e*. At stage C, the drone 250 may administer a test of the motion sensor 220*e* within range of the motion sensor 220*e*, navigating past the motion sensor 220*e*, or the like. In some implementations, the drone 250 may administer the test to the motion sensor 220*e* using the three-stage process for administering a sensor test that was described with respect to FIG. 1. Alternatively, the drone 250 may administer a test of the motion sensor 220*e* that uses less than each of the first message, the second message, and the third message described with reference to FIG. 1. For example, in some implementations, the drone 250 may utilize a single-stage testing process that generates and broadcasts only the second message that includes a timestamp indicative of point in time when the test of the motion sensor 220*e* was administered. In such instances, the monitoring system 100 may then evaluate the functionality of the motion sensor 220*e* based on sensor data, or lack thereof, detected within the predetermined time period of the timestamp form the second message.

The drone 250 may continue to navigate to the next respective sensor, camera or the like that was identified in the received instructions from the monitoring system control unit 210. For example, the drone 250 may continue to navigate along the navigation path 205 to a thermostat 220*g*. The thermostat 220*g* includes a thermometer. At stage D, the drone 250 may administer a test of the thermostat 220*g* by using the drone-mounted sensor testing unit 250*a* to output hot air, cold air, or the like in an effort to change the temperature of the air surrounding the thermostat 220*g*. In some implementations, the drone 250 may administer the test to the thermostat using the three-stage process for administering a sensor test that was described with respect to FIG. 1. Alternatively, the drone 250 administer a test of the thermostat 220*g* that uses less than each of the first message, the second message, and the third message described with reference to FIG. 1. For example, in some implementations, the drone 250 may utilize a single-stage testing process that generates and broadcasts only the second message that includes a timestamp indicative of point in time when the test of the thermostat was administered. In such instances, the monitoring system 100 may then evaluate the functionality of thermostat 220*g* based on sensor data, or lack thereof, detected within the predetermined time period of the timestamp form the second message.

The monitoring system control unit 210 (or monitoring application server 290) may be configured to evaluate the functionality of the sensors 220*i*, 220*b*, 220*e*, 220*g* based on the sensor data, or lack thereof, that is generated by each respective sensor 220*i*, 220*b*, 220*e*, 220*g* in response to test of each respective sensor that is administered by the drone 250. For example, the monitoring system control unit 210 (or monitoring application server 290) may analyze sensor data, or lack thereof, for each respective sensor that is generated within a predetermined time period of a first message, a second message, a third message, or a combination thereof, as described with reference to FIG. 1 to determine if each respective sensor is functioning properly. The monitoring system control unit 210 (or monitoring application server 290) may generate a sensor status report that includes data indicating the results of the administered sensor tests. In some implementations, the sensor status report may include granular details regarding the type of sensor data, or lack thereof, generated by each respective sensor in response to an administered test. Alternatively, or in addition, the status report may include a binary value that represents whether each respective sensor failed or passed the administered test. Though the status report is referred to as a sensor status report, the present disclosure need not be so limited. Instead, the sensor status report may include a status report regarding tested cameras, and other components of the monitoring system 200 that can be tested by the drone 250.

The description of the testing of multiple sensors in the property with reference to FIG. 2 is exemplary and can vary in numerous ways across different implementations. For example, the drone 250 may be used to test more, or less, sensors or the like with respect to the property 201. Alternatively, or in addition, the drone 250 can be used to test cameras 230*a*, 230*b*, 230*c*, 230*d*, 230*e*, 230*f* such as cameras whose image, video, or audio recording is triggered in response to detection of motion, audio signals, or the like. In such instances, the cameras triggered by motion or audio may be tested in a manner similar to the testing of motion sensors 220*e* and glass-break sensor 220*b*. In such instances, the monitoring system control unit 210 (or monitoring application server 290) may be configured to analyze the results of the test, and determine whether the tested camera (s) began recording images, video, audio, or the like in response to an administered test. Alternatively, or in addition, other types of sensors other those mentioned with reference to FIG. 2 may be tested by the drone 250. For example, the drone 250 can test temperature sensors, carbon monoxide sensors, or the like in the same, or similar, manner as set forth with respect to the thermostat 220*g* or smoke detector 220*i*, respectively.

Figure 3:
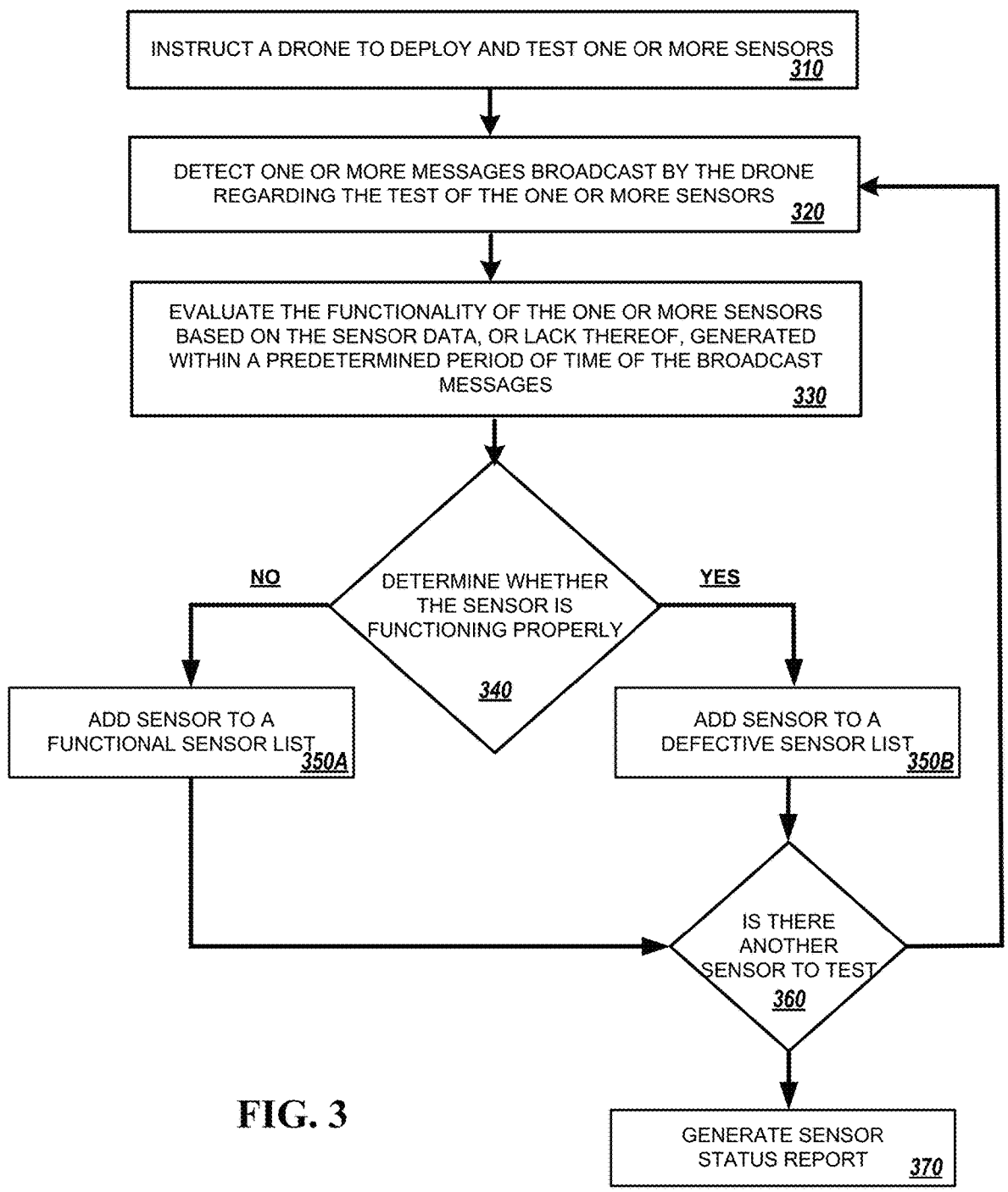
FIG. 3 is an example of a process for using a drone to test monitoring system sensors.

FIG. 3 is an example of a process 300 for using a drone to test monitoring system sensors. Generally, the process 300 includes instructing a drone to deploy and test one or more sensors (310), detecting one or more messages broadcast by the drone regarding the test of the one or more sensors (320), evaluating the functionality of the one or more sensors based on the obtained sensor data, or lack, generated within a predetermined period of time from the broadcast messages (330), and determining whether the sensor is functioning properly based on the evaluating stage (340). In response to determining that the sensor is not function a properly, adding the sensor to a defective sensor list (350A). Alternatively, in response to determining that the sensor is not functioning properly, adding the sensor to a functional sensor list (350B). Determining whether there is another sensor of the one or more sensors that needs to be tested (360). In response to determining that there is another sensor to test, return to stage (320) to detect one or more message broadcast by the drone regarding the test of the one or more sensors. Alternatively, in response to determining that there is not another sensor to test, generating a second status report (370).

For convenience, the process 300 will be described as being performed by a monitoring system such as the monitoring system 100 or 200 described with respect to FIGS. 1 and 2 respectively.

In more detail, the monitoring system can instruct 310 a drone to deploy and test one or more sensors. For example, the monitoring system transmit a message to the drone that includes one or more instructions. The one or more instructions may include at least (i) a launch instruction, (ii) a sensor identifier that identifies one or more particular sensors and (iii) an instruction to test the one or more sensors identified by the one or more instructions, or the like. Alternatively, or in addition, the one or more instructions may also include a sensor location of each sensor identified by the one or more instructions, a test type identifier for each sensor identified by the one or more instructions, one or more camera identifiers, one or more camera location for each camera identified by the one or more instructions, an instruction to test the one or more cameras identified by the one or more instructions, a test type identifier for each camera identified by the one or more instructions, a combination thereof, or the like.

The monitoring system can detect 320 one or more messages broadcast by the drone regarding the test of the one or more sensors. For example, the monitoring system can detect a first message that is broadcast by the drone. The first message may be broadcast by the drone in response to the drone determining that the drone is within a predetermined distance of a particular one of the one or more sensors, cameras, or the like that were identified by the one or more instructions for testing. In such instances, the first message is generated before the drone tests the sensor. The first message may include data indicating that (i) the drone is within a predetermined distance of the sensor to be tested, (ii) the drone is going to administer a test of the smoke detector, (iii) the drone is going to administer a test of the smoke detector within a predetermined amount of time, (iv) a first timestamp identifying the point in time that the first message is broadcast, (v) a combination thereof, or (vi) the like.

Alternatively, or in addition, the monitoring system can detect a second message that is broadcast by the drone. The second message may be broadcast by the drone in response to administering the test of the particular one of the one or more sensors, cameras, or the like based on the received instructions. The second message may include data indicating a second timestamp. The second timestamp may be captured, obtained, generated, stored, or the like contemporaneously with the administration of as sensor or camera test by the drone. Accordingly, the second timestamp may be indicative of the time the drone administered the sensor or camera test.

Alternatively, or in addition, the monitoring system can detect a third message that is broadcast by the drone. The third message may be broadcast by the drone after the drone the drone has administered the test to the particular sensor of the particular sensor of the one or more sensors, cameras, or the like based on the received instructions. The third message may include data indicating that (i) the drone 150 has administered a test of the smoke detector 120i, (ii) a third timestamp that is associated with the point in time when the third message was broadcast, (iii) a combination thereof, or (iv) the like.

Though three messages are described as being generated and broadcast by the drone at three specific points in time in relation to the administered test, the present disclosure need not be so limited. For example, the drone may generate and broadcast only one message (e.g., a messaging indicating a timestamp associated with the administered test, a message with a timestamp prior to the test, a message with a timestamp after the test, or the like). Alternatively, the drone may generate and broadcast only two messages (e.g., a message with a timestamp of a time before the administered test and a message with a timestamp after the administered test). Nonetheless, in each example, the monitoring system can detect the one or more messages broadcast by the drone.

The monitoring system can evaluate 330 the functionality of the one or more sensors based on the sensor data, or a lack thereof, generated within a predetermined period of time of the one or more broadcast messages. For example, the monitoring system can obtain the first timestamp and the third timestamp in the one or more detected messages broadcast by the drone and determine whether any sensor data was generated during the time period between the first timestamp and the third timestamp by the particular sensor of the one or more sensor for which the test was administered. Alternatively, the monitoring system can obtain the second timestamp that is indicative the drone administered the test of the particular sensor. In such instances, the monitoring system may determine whether any sensor data was generated within a predetermined amount of time of the second timestamp. Alternatively, in some implementations, the monitoring system may use data included within all three messages in order to evaluate the functionality of one or more sensors. For example, the monitoring system can use the first time stamp and the third timestamp to determine a time period to analyze sensor data generated by the particular sensor. The monitoring system can then determine whether any sensor data was generated by the particular sensor that was tested by determining whether any sensor data was generated within a time period of the second timestamp, wherein the time period is established by the first timestamp and the second timestamp.

The description of stage 330 refers to the monitoring system evaluating sensor data, the present disclosure need not be so limited. For example, the monitoring system may also evaluate camera data (e.g., images capture, video record, audio recorded, sensor data generated by one or more camera sensors, or the like) that is associated with one or more cameras that were tested.

The monitoring system can determine 340 whether the one or more sensors are functioning properly based on the evaluating stage 330. Determining whether the particular sensor is functioning properly may include the monitoring system determining that the particular sensor that was tested generated sensor data that was expected by the monitoring system in response to the administered test. For example, in response to a test that introduces smoke to an environment around smoke detector, the monitoring system may expect to detect sensor data within a predetermined time period of introducing the smoke into the environment around the smoke detector that is indicative of the presence of smoke. Similarly, in response to a test that introduces motion within range of a motion sensor, then the monitoring system may expect to detect sensor data within a predetermined time period of introducing motion into the range of the motion sensor. In each instance, the predetermined time period may be determined based on the timestamps of the first message, the second message, the third message, or a combination thereof.

Determining whether the one or more sensors is functioning properly may include the determining that the one or more sensors is not functioning properly. Determining that a particular sensor is not functioning problem may include determining by the monitoring system that the particular sensor generated sensor data that was not expected by the monitoring system in response to a particular test. By way of example, the monitoring system may determine, in some instances, that a smoke detector generated some form of sensor data output within a predetermined time period in response to the drone polluting the area around the smoke detector with smoke that did not indicate that smoke was present. The generated sensor data may have been noisy data, indecipherable data, or the like that did not generate data indicating a potential alarm in response to the test. Alternatively, or in addition, determining that a particular sensor is not functioning properly may include the monitoring system determining that the particular sensor that was tested did not generate any sensor data at all within a predetermined time period in response to a test. By way of example, the monitoring system may determine, in some instances, that a smoke detector did not generate any sensor data in response to the drone polluting the area around the smoke detector with smoke. In each instance, the predetermined time period may be determined based on the timestamps of the first message, the second message, the third message, or a combination thereof.

In response to determining that the sensor that was tested is functioning properly, the monitoring system may add 350A the tested sensor to a functional sensor list. Alternatively, in response to determining that the sensor that was tested is not functioning properly, the monitoring system may add 350B the tested sensor to a defective sensor list.

The monitoring system may determine 360 whether there is another sensor of the one or more sensors that needs to be tested. For example, the monitoring system may access and analyze the one or more instructions transmitted to the drone. The monitoring system can determine, based on the one or more instructions the set of one or more sensors that were to be tested. The monitoring system may determine the sensors that have been tested based on the functional sensor list and the defective sensor list. Then, based on the sensors that were to be tested and the sensors that have been tested, the monitoring system can determine whether there are any more sensors to be tested.

In response to determining that there are one or more sensors to be tested, monitoring system be begin monitoring for one or more messages broadcast by the deployed drone related to the test of at least one of the one or more sensors that remain to be tested. Then, the monitoring system may continue to perform the process 300 at stage 320. Alternatively, in response to determining that there are no more sensors to be tested, the monitoring system may generate 370 a sensor status report. In some implementations, the sensor status report may be generated based on the functional sensor list and the defective sensor list.

Figure 4:
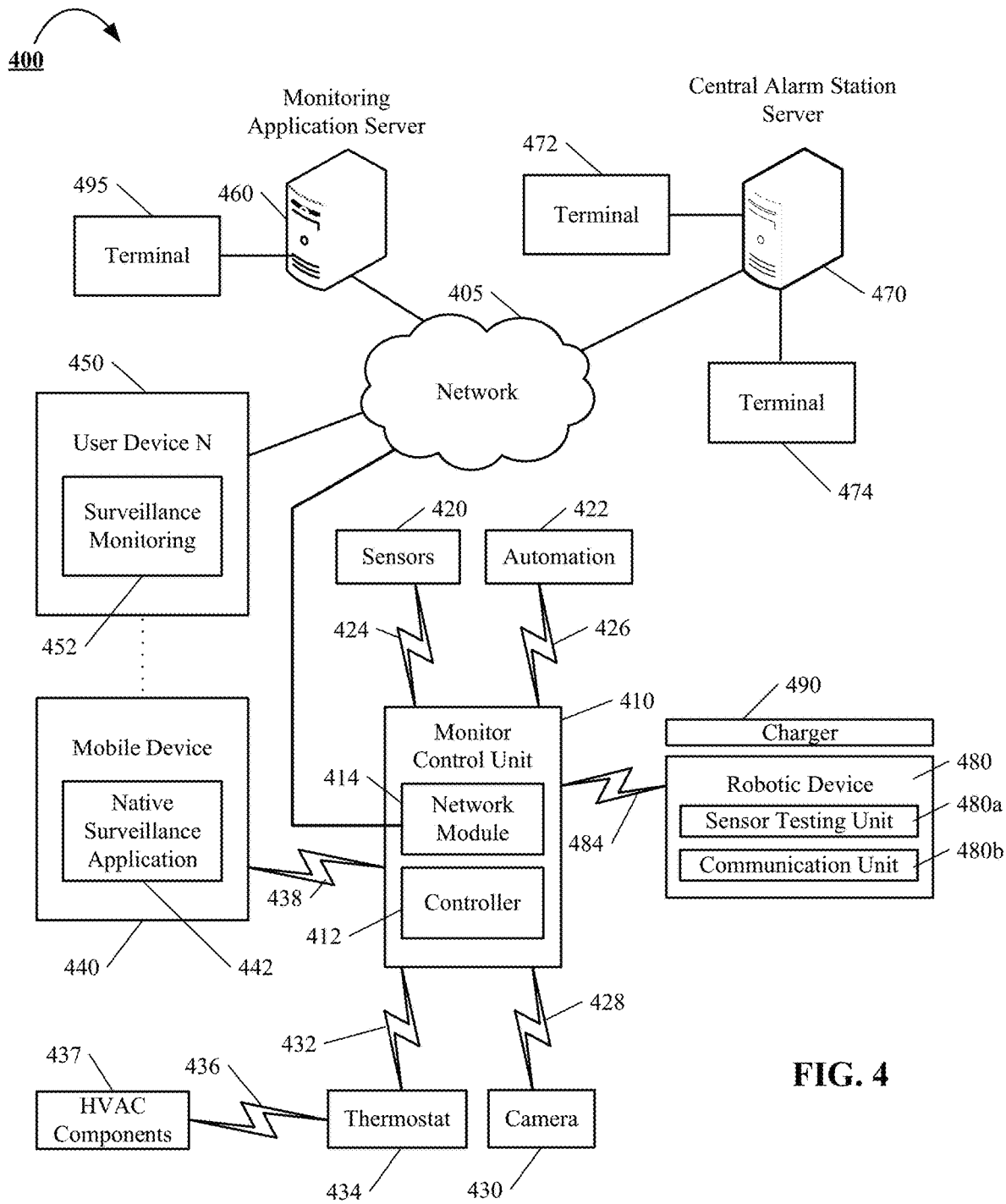
FIG. 4 is a block diagram of some example components that can be used to implement a system for using drones to test monitoring system sensors.

FIG. 4 is a block diagram of some example components that can be used to implement a system for using drones to test monitoring system sensors.

The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 210. For instance, the module 222 may cause a lighting system to illuminate an area to provide a better image of the area when captured by a camera 230.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring system control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes at least one robotic devices 480. The robotic device 480 may be any type of robot that is capable of moving and taking actions that assist in security monitoring, mapping a property, or the like. For example, the robotic devices 480 may include a drone that is capable of moving throughout a property based on automated control technology, user input control provided by a user, or a combination of both. In this example, the drone may be able to fly, roll, walk, or otherwise move about the property. The drone may include a helicopter type device (e.g., a quad copter), a rolling helicopter type device (e.g., a roller copter device that can fly and also roll along the ground, walls, or ceiling), or a land vehicle type device (e.g., an automated car that drives around a property).

The robotic device 480 may include a drone-mounted sensor testing unit 480*a*. The sensor testing unit 480*a* may include one or more testing devices that can be used to test sensor 462 associated with the property. For example, the sensor testing unit 480*a* may have a smoke generation unit that can be used to test a smoke detector. Alternatively, or in addition, for example, the sensor testing unit 480*a* may have a heat generator, an air conditioning unit, or the like that can be used to test a thermostat. Alternatively, or in addition, the sensor testing unit 480*a* may include a speaker that can output audio sounds to test sensors based on audio signals such as glass-break sensors, audio detection sensors for cameras, or the like. Alternatively, or in addition, the sensor testing unit 480*a* may include a carbon monoxide gas generation unit that can be used to test carbon monoxide sensors. Alternatively, or in addition, the sensor testing unit 480*a* may include a deployable arm that can be used to open a window in an effort to test a contact sensor. However, the present disclosure need not be so limited. The sensor testing unit 480*a* can be equipped to test any sensor that may be placed in the property and used with the monitoring system.

The robotic device 480 also may include a communication unit 480*b* that enables the robotic device 480 to communicate with the monitoring system control unit 410 and/or other devices. The communication unit 480*b* may be a wireless communication module that allows the robotic device 480 to communicate wirelessly. For instance, the communication unit 480*b* may be a Wi-Fi module that enables the robotic device 480 to communicate over a local wireless network at the property. The communication unit 480*b* further may be a 900 MHz wireless communication module that enables the robotic device 480 to communicate directly with the monitoring system control unit 410. Other types of short-range wireless communication protocols, such as Bluetooth, Bluetooth LE, Zwave, Zigbee, etc., may be used to allow the robotic device 480 to communicate with other devices in the property.

The robotic device 480 may use the communication unit 480*b* to broadcast messages regarding the robotic device's 480 test status. For example, the robotic device 480 may use the communication unit 480*b* to broadcast a first message with a timestamp prior to administering a test of a sensor, camera, or the like. Alternatively, or in addition, the robotic device 480 may use the communication unit 480*b* to broadcast a second message with a timestamp as administration of a sensor test commences, during testing of a sensor test, or the like. Alternatively, or in addition, the robotic device 480 may use the communication unit 480*b* to broadcast a third message with a timestamp after administration of the sensor test is completed. The broadcasted messages may detected by a monitoring system control unit 410, a monitoring application server 460, or the like and used to evaluate the results of each respective sensor test.

The robotic device 480 further may include processor and storage capabilities. The robotic device 480 may include any suitable processing devices that enable the robotic device 480 to operate applications and perform the actions described throughout this disclosure. In addition, the robotic device 480 may include solid state electronic storage that enables the robotic device 480 to store one or more predetermined navigation paths for the property, an initial three-dimensional volumetric map of the property, or the like.

The robotic device 480 may be associated with a charging station 490. The charging station 490 may be located at predefined home base or reference locations in the property. The robotic device 480 may be configured to navigate to the charging station 490 after completion of tasks needed to be performed for the monitoring system 400. For example, after navigating the property on a predetermined trajectory to collect data using mapping sensors 484 that can be used to generate a 3D volumetric map of the property, the robotic device may be configured to automatically fly to and land on the charging station 490. In this regard, the robotic device 480 may automatically maintain a fully charged battery in a state in which the robotic devices 480 is ready for use by the monitoring system 400.

The charging station 490 may be a contact based charging station and/or a wireless charging station. For contact based charging stations, the robotic device 480 may have readily accessible points of contact that the robotic device 480 is capable of positioning and mating with a corresponding contact on the charging station. For instance, a helicopter type robotic device 480 may have an electronic contact on a portion of its landing gear that rests on and mates with an electronic pad of a charging station when the helicopter type robotic device 480 lands on the charging station. The electronic contact on the robotic device 480 may include a cover that opens to expose the electronic contact when the robotic device 480 is charging and closes to cover and insulate the electronic contact when the robotic device 480 is in operation.

For wireless charging stations, the robotic device 480 may charge through a wireless exchange of power. In these cases, the robotic device 480 need only locate themselves closely enough to the wireless charging station for the wireless exchange of power to occur. In this regard, the positioning needed to land at a predefined home base or reference location in the property may be less precise than with a contact based charging station. Based on the robotic device 480 landing at a wireless charging station, the wireless charging station outputs a wireless signal that the robotic device 480 receives and converts to a power signal that charges a battery maintained on the robotic device 480.

The sensors 420, the module 422, the camera 430, the thermostat 434, and the robotic devices 480 and 482 communicate with the controller 412 over communication links 424, 426, 428, 432, and 484. The communication links 424, 426, 428, 432, and 484 may be a wired or wireless data pathway configured to transmit signals from the sensors 420, the module 422, the camera 430, the thermostat 434, and the robotic device 480 to the controller 412. The sensors 420, the module 422, the camera 430, the thermostat 434, and the robotic device 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the module 422, the camera 430, the thermostat 434, and the robotic device 480 and the controller 412 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 410. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410, one or more robotic device 480 the one or more user devices 440, 450, or a combination thereof.

The monitoring system control unit 410, the monitoring application server 460, or both may be used to evaluate the results of a sensor test. For example, the monitoring system control unit 410, the monitoring application server 460, or both can be used to detect sensor data, or lack thereof, generated during a period of time associated with the sensor test, and determine whether the sensor is functioning properly. The period of time associated with the sensor test may be based on, for example, time stamps associated with one or more messages broadcast by the drone prior to administration of a sensor test, during administration of the sensor test, and after administration of the of sensor test.

The central alarm station server 470 is an electronic device configured to provide alarm monitoring service by exchanging communications with the monitoring system control unit 410, the robotic device 480, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450, the robotic device 480, and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as wifi, Bluetooth, zwave, zigbee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 210, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In other implementations, the system 400 further includes network 405 and the sensors 420, the module 422, the camera 430, the thermostat 434, and the robotic device 480 is configured to communicate sensor and image data to the one or more user devices 440, 450 over network 405 (e.g., the Internet, cellular network, etc.). In yet another implementation, the sensors 420, the module 422, the camera 430, the thermostat 434, and the robotic device 480 (or a component, such as a bridge/router) are intelligent enough to change the communication pathway from a direct local pathway when the one or more user devices 440, 450 are in close physical proximity to the sensors 420, the module 422, the camera 430, the thermostat 434, and the robotic device 480 to a pathway over network 405 when the one or more user devices 440, 450 are farther from the sensors 420, the module 422, the camera 430, the thermostat 434, and the robotic device 480. In some examples, the system leverages GPS information from the one or more user devices 440, 450 to determine whether the one or more user devices 440, 450 are close enough to the sensors 420, the module 422, the camera 430, the thermostat 434, and the robotic device 480 to use the direct local pathway or whether the one or more user devices 440, 450 are far enough from the sensors 420, the module 422, the camera 430, the thermostat 434, and the robotic device 480 that the pathway over network 405 is required. In other examples, the system leverages status communications (e.g., pinging) between the one or more user devices 440, 450 and the sensors 420, the module 422, the camera 430, the thermostat 434, and the robotic device 480 to determine whether communication using the direct local pathway is possible. If communication using the direct local pathway is possible, the one or more user devices 440, 450 communicate with the sensors 420, the module 422, the camera 430, the thermostat 434, and the robotic device 480 using the direct local pathway. If communication using the direct local pathway is not possible, the one or more user devices 440, 450 communicate with the sensors 420, the module 422, the camera 430, the thermostat 434, and the robotic device 480 using the pathway over network 405.

The invention claimed is:

1. A monitoring system for using a drone to test monitoring system sensors, the system comprising:
   one or more processors; and
   one or more storage devices that include instructions that are operable, when executed by the one or more processors, to cause the one or more processors to perform operations comprising:
      detecting, by the monitoring system, that a test of a monitoring system sensor that is located at a property has been initiated by the drone;
      determining, by the monitoring system and based on the test of the monitoring system sensor initiated by the drone, whether the monitoring system sensor is functioning properly; and
      in response to determining whether the monitoring system sensor is functioning properly, storing, by the monitoring system, data indicating whether the monitoring system sensor is functioning properly.

2. The system of claim 1, wherein:
determining whether the monitoring system sensor is functioning properly comprises determining that the monitoring system sensor is not functioning properly, and
storing the data indicating whether the monitoring system sensor is functioning properly comprises storing data indicating that the monitoring system sensor is not functioning properly.

3. The system of claim 1, wherein:
determining whether the monitoring system sensor is functioning properly comprises determining that the monitoring system sensor is functioning properly,
the operations further comprise:
in response to determining that the monitoring system sensor is functioning properly, disregarding, by the monitoring system, sensor data generated by the monitoring system sensor within a predetermined period of time of determining that the monitoring system sensor is functioning properly, and
storing the data indicating whether the monitoring system sensor is functioning properly comprises storing data indicating that the monitoring system sensor is functioning properly.

4. The system of claim 1, wherein the operations comprise:
detecting, by the monitoring system, a message (i) broadcast by the drone and (ii) indicating that the drone has completed the test of the monitoring system sensor.

5. The system of claim 4, wherein determining whether the monitoring system sensor is functioning properly comprises:
determining, by the monitoring system, whether the monitoring system sensor is functioning properly based on a period of time after detecting the message indicating that the drone has completed administration of the test of the monitoring system sensor.

6. The system of claim 1, wherein determining whether the monitoring system sensor is functioning properly comprises:
determining that sensor data generated by the monitoring system sensor includes sensor data that was not expected, by the monitoring system, to be generated in response to of the test; and
based on determining that the sensor data generated by the monitoring system sensor includes sensor data was not expected to be generated in response to the test, determining that the monitoring system sensor is not functioning properly.

7. The system of claim 1, wherein determining whether the monitoring system sensor is functioning properly comprises:
determining that sensor data generated by the monitoring system sensor includes sensor data that was expected, by the monitoring system, to be generated in response to the test; and
based on determining that the sensor data generated by the monitoring system sensor includes sensor data was expected to be generated in response to the test, determining that the monitoring system sensor is functioning properly.

8. The system of claim 1, wherein:
the monitoring system sensor includes a motion sensor, and
the test includes the drone navigating through a portion of the property that is within range of the motion sensor.

9. The system of claim 1, wherein:
the monitoring system sensor includes a glass break sensor, and
the test includes the drone using a speaker to output, within range of the glass break sensor, audio signals having a frequency that is sufficient to trigger the glass break sensor.

10. The system of claim 1, wherein:
the monitoring system sensor includes a smoke detector, and
the test includes the drone outputting smoke within range of the smoke detector.

11. The system of claim 1, wherein the operations comprise:
transmitting, by the monitoring system and to the drone, an instruction to test one or more sensors.

12. A method for using a drone to test monitoring system sensors, the method comprising:
detecting, by a monitoring system, that a test of a monitoring system sensor that is located at a property has been initiated by the drone;
determining, by the monitoring system and based on the test of the monitoring system sensor initiated by the drone, whether the monitoring system sensor is functioning properly; and
in response to determining whether the monitoring system sensor is functioning properly, storing, by the monitoring system, data indicating whether the monitoring system sensor is functioning properly.

13. The method of claim 12, wherein:
determining whether the monitoring system sensor is functioning properly comprises determining that the monitoring system sensor is not functioning properly, and
storing the data indicating whether the monitoring system sensor is functioning properly comprises storing data indicating that the monitoring system sensor is not functioning properly.

14. The method of claim 12, wherein:
determining whether the monitoring system sensor is functioning properly comprises determining that the monitoring system sensor is functioning properly,
the method comprises:
in response to determining that the monitoring system sensor is functioning properly, disregarding, by the monitoring system, sensor data generated by the monitoring system sensor within a predetermined period of time of determining that the monitoring system sensor is functioning properly, and
storing the data indicating whether the monitoring system sensor is functioning properly comprises storing data indicating that the monitoring system sensor is functioning properly.

15. The method of claim 12, comprising:
detecting, by the monitoring system, a message (i) broadcast by the drone and (ii) indicating that the drone has completed the test of the monitoring system sensor.

16. The method of claim 12, wherein determining whether the monitoring system sensor is functioning properly comprises:
determining that sensor data generated by the monitoring system sensor includes sensor data that was not expected, by the monitoring system, to be generated in response to of the test; and based on determining that the sensor data generated by the monitoring system sensor includes sensor data was not expected to be generated in response to the test, determining that the monitoring system sensor is not functioning properly.

17. The method of claim 12, wherein determining whether the monitoring system sensor is functioning properly comprises:
determining that sensor data generated by the monitoring system sensor includes sensor data that was expected, by the monitoring system, to be generated in response to the test; and
based on determining that the sensor data generated by the monitoring system sensor includes sensor data was expected to be generated in response to the test, determining that the monitoring system sensor is functioning properly.

18. The method of claim 12, wherein:
the monitoring system sensor includes a motion sensor, and
the test includes the drone navigating through a portion of the property that is within range of the motion sensor.

19. The method of claim 12, wherein:
the monitoring system sensor includes a smoke detector, and
the test includes the drone outputting smoke within range of the smoke detector.

20. The method of claim 12, comprising:
transmitting, by the monitoring system and to the drone, an instruction to test one or more sensors.

* * * * *